Sept. 7, 1965

J. V. TRIPOLI ETAL 3,204,919

SPLIT SLEEVE CONTROL VALVE

Filed July 31, 1961

INVENTORS
JOSEPH V. TRIPOLI
& HERMAN KLAUBE

BY *Lowry & Rinehart*

ATTORNEYS

Sept. 7, 1965  J. V. TRIPOLI ETAL  3,204,919
SPLIT SLEEVE CONTROL VALVE
Filed July 31, 1961  2 Sheets-Sheet 2

INVENTORS
JOSEPH V. TRIPOLI
& HERMAN KLAUBE
BY Lowry & Rinehart
ATTORNEYS

United States Patent Office 3,204,919
Patented Sept. 7, 1965

3,204,919
SPLIT SLEEVE CONTROL VALVE
Joseph V. Tripoli, Kenmore, N.Y. (1622 Fillmore Ave., Buffalo, N.Y.), and Herman Klaube, Buffalo, N.Y.; said Klaube assignor to said Tripoli
Filed July 31, 1961, Ser. No. 127,943
4 Claims. (Cl. 251—8)

This invention relates in general to new and useful improvements in valve construction, and more particularly to a valve having a split sleeve for the purpose of controlling the flow of fluid through the valve.

A primary object of this invention is to provide a novel flow control valve which includes a valve body having mounted therein a split sleeve which extends the full length of the valve body and which solely defines the flow passage through the valve, the split sleeve being flexible and movable together to close off the flow passage.

Another object of this invention is to provide a novel split sleeve for use in a flow control valve, the split sleeve being configurated to extend the full length of a valve body and form the sole means for defining a flow passage through the valve body, the split sleeve being formed of a pair of opposed diaphragms having their longitudinal edges clamped together and sealed with respect to the valve body, each of the diaphragms being suitably constructed wherein it may be formed of almost any suitable material, including rubber, synthetic materials, including plastics, fibers or metals, or various combinations thereof.

Another object of this invention is to provide a novel diaphragm for use as a half of a split sleeve for a flow control valve, the diaphragm being provided with a plurality of nested continuous peripheral grooves and projections whereby two way stretching of the diaphragm may be accomplished.

Another object of this invention is to provide a novel flow control valve wherein the split sleeve is utilized for the purpose of defining the flow passage through the valve and for controlling the effective cross-section of the flow passage, the split sleeve being in the form of a pair of opposed diaphragms having means connected thereto for flexing the same between a contacting flow passage closing position, and a spaced apart flow passage open position, and there being provided suitable means for effecting the movement of the diaphragms to effect the opening and closing of the flow control valve.

Still another object of this invention is to provide a novel flow control valve which utilizes a split sleeve for the control means, the split sleeve being formed of a pair of opposed diaphragms which are backed up by strong backs, the strong backs being suitably movable by suitable control means to effect the necessary flexing of the diaphragms for effecting the control of fluid through the flow control valve.

A further object of this invention is to provide a novel flow control valve wherein a pair of opposed strong backs are carried by valve stems which have oppositely threaded portions engaged with respective ones of the strong backs so that when the valve stems are rotated, the strong backs will rotate in opposite directions, and there being provided suitable means for simultaneously rotating the valve stems, each of the strong backs being connected to a diaphragm which forms part of a flow passage defining sleeve wherein movement of the strong backs will effect the cross-section of the flow passage.

With the above and other objects in view that will hereinafter appear, the nature of the invention will be more clearly understood by reference to the following detailed description, the appended claims and the several views illustrated in the accompanying drawings:

Figure 1:
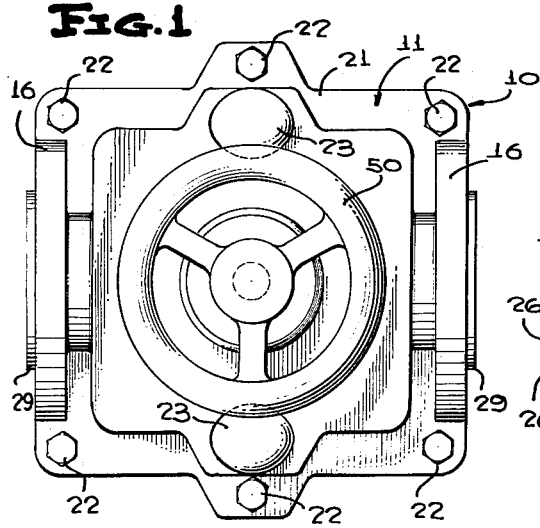
FIGURE 1 is a plan view of the flow control valve and shows generally the outline therof.
Figure 2:
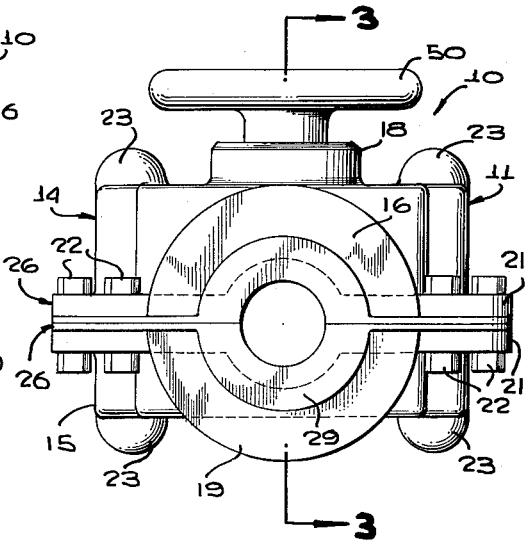
FIGURE 2 is an end view of the flow control valve of FIGURE 1 as appearing from the right end thereof.

Referring now to the drawings in detail, it will be seen that there is illustrated a flow control valve in accordance with this invention, the flow control valve being generally referred to by the numeral 10. The flow control valve 10 includes a valve body, which is generally referred to by the numeral 11. The valve body is provided with openings at opposite ends which, for identification purposes only, will be identified as an inlet openings 12 and an outlet opening 13.

The valve body 11 is formed of a pair of halves 14 and 15. The halves 14 and 15 are of a slightly different construction. The half 14 is provided at opposite ends with coupling flanges 16 and has a relatively deep outwardly projecting central portion 17. The central portion 17 in addition has a centrally located boss 18, the purpose of which will be described in detail hereinafter. On the other hand, the valve body half 15 is provided with a pair of mounting flanges 19 at the opposite ends thereof which correspond to the mounting flanges 16. The valve body half 15 also has a relatively shallow outwardly offset central portion 20 as compared to the relatively deep central portion 17.

Figure 5:
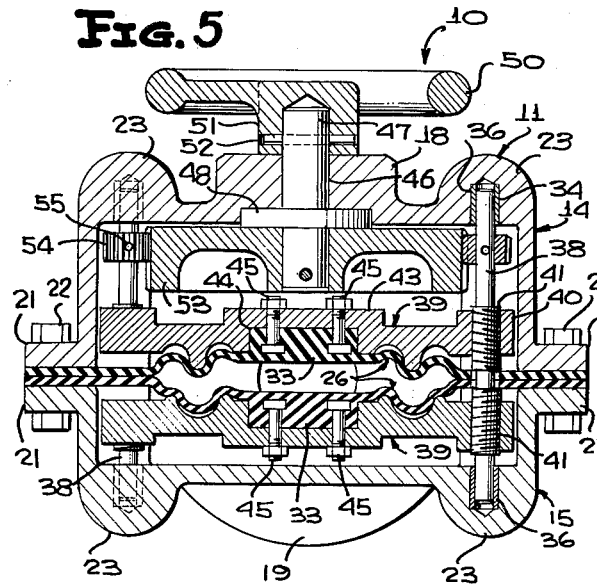
FIGURE 5 is a transverse vertical sectional view taken along the line 5—5 of FIGURE 3 and shows the specific details of the flow control valve in open position and including the means for opening and closing the split sleeve which defines the flow passage therethrough.

As is best shown in FIGURES 1 and 5, the valve body halves 14 and 15 are provided with peripheral clamping flanges 21, which are releasably secured together by means of nut and bolt type fasteners 22. In addition, each of the valve body halves 14 and 15 is provided with a pair of centrally located, transversely aligned generally semispherical projections 23, the purpose of which will be described hereinafter.

Figure 3:
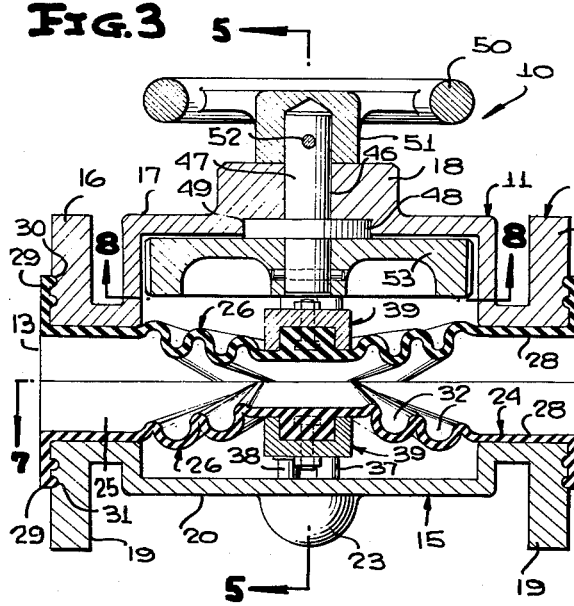
FIGURE 3 is a vertical sectional view taken along the line 3—3 of FIGURE 2, and shows the specific details of the internal construction of the flow control valve, the valve being in an open position.
Figure 4:
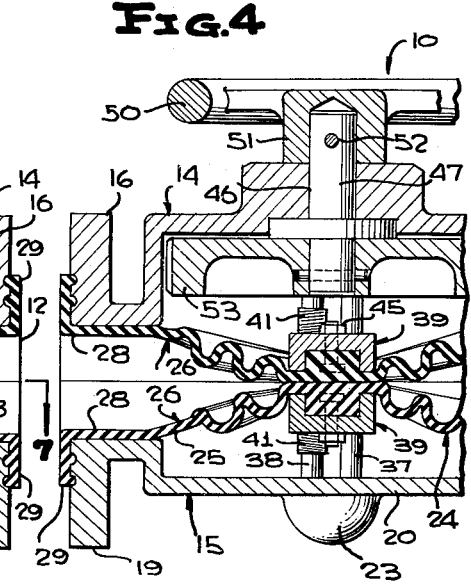
FIGURE 4 is a fragmentary vertical sectional view similar to FIGURE 3 and shows the valve in a closed position.
Figure 7:
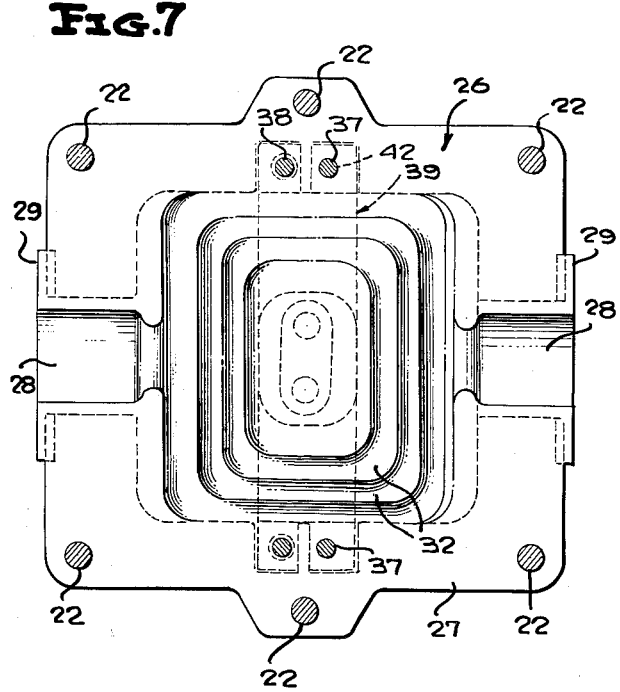
FIGURE 7 is a horizontal sectional view taken along the line 7—7 of FIGURE 3, and shows the specific details of one of the diaphragms.
Figure 8:
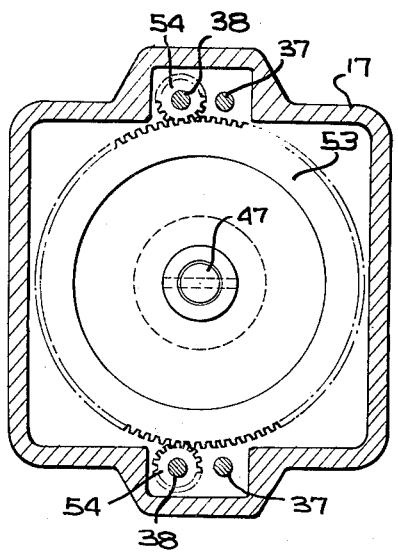
FIGURE 8 is a horizontal sectional view taken along the line 8—8 of FIGURE 3 and shows the specific details of the gearing for simultaneously driving the valve stems.

A split sleeve, generally referred to by the numeral 24, is mounted within the valve body 11 and defines a flow passage 25 therethrough. The splite sleeve 24 is formed of a pair of identical diaphragms, generally referred to by the numeral 26. Each of the diaphragms 26 has a generally rectangular outline, as is best shown in FIGURE 7. Each diaphragm 26 has a peripheral flange portion 27 which corresponds to the general outlines of the clamping flanges 21 of the valve body 14. The peripheral flange 27 is interrupted at longitudinally opposite ends of the diaphragm 26 by a generally semicircular portion 28 which terminates in a semiannular sealing flange 29. When the diaphragms 26 are clamped between the halves 14 and 15 of the valve body 11, the flange 27 is engaged by the clamping flanges 21 and the nut and bolt type fasteners 22 are passed therethrough to tightly clamp the peripheral edge of each of the diaphragms 26 to the valve body 11 and to the other diaphragm 26 in sealed relation. At the same time, the semicircular portions 28 of each diaphragm 26 is seated in a respective one of the openings 12 and 13 of the valve body 11 and the semiannular flanges 29 are opposed against the remote ends of the flanges 16 and 19, as is best shown in FIGURE 3. At this time, it is pointed out that the flanges 16 and 19 have semiannular recesses 30 which receive suitable ribbing 31 on the flanges 29 so as to provide for an interlock between the diaphragms 26 and the connecting flanges 16 and 19 of the valve body 11. Thus, when the valve body 11 is bolted or clamped to a flange pipe or pipe fitting, an effective seal between the ends of the split sleeve 24 and the ends of the valve body 11 is effected. At this time, it is pointed out that the flanges 16 and 19 have not been illustrated as having bolt holes therein. It is to be understood that a suitable bolt hole pattern will be provided in the flanges 16 and 19, when needed in accordance with the requirements.

Reference is again made to FIGURE 7 wherein it is shown that the central portion of each diaphragm 26 is in the form of a plurality of nested continuous peripheral grooves and projections 32 with each groove and each projection being of a generally rectangular outline. Further, as is best illustrated in FIGURES 3 and 5, the central portion of each diaphragm 26 is provided with an outwardly directed, generally rectangular mounting block 33. It is also pointed out that the two diaphragms 26 are not identical, the diaphragms having complementary grooves and projections so that the diaphragms may be seated with respect to one another in a closed position of the flow control valve 10, as is best shown in FIGURE 6.

At this time, it is pointed out that the diaphragms 26, due to their particular configurations and flexibility, may be formed of almost any suitable flexible material, including rubber, synthetics, including plastic, fibers, metal, and various combinations thereof, as well as in various plies and thicknesses. The particular arrangement of the grooves and projections 32 permits stretching of the diaphragms 26 in opposite directions, as is required in the movement of the central portions of the diaphragms 26 to effect the control of the cross-section of the flow passage 25 through the flow control valve 10.

Figure 6:
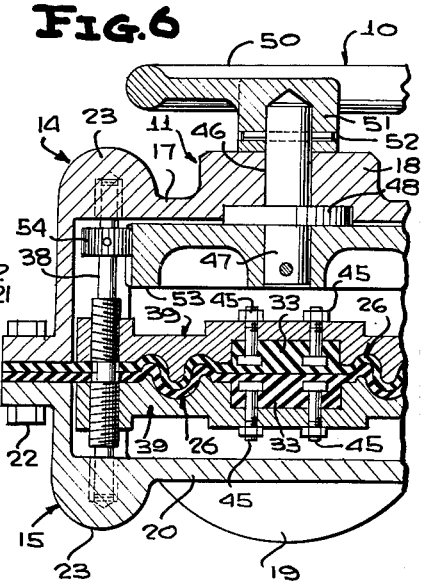
FIGURE 6 is a fragmentary sectional view similar to FIGURE 5 and shows the flow control valve in a closed position.

Referring now to FIGURES 5 and 6 in particular, it will be seen that each of the projections 23 is provided with a bore disposed vertically to the plane of the diaphragms 26, each bore being referred to by the numeral 34 and opening into the interior of the valve body 11. A suitable bushing 36 is mounted in each bore. Although only one of the bores 34 is shown in each of the projections 23, since the valve body 11 is vertically split in FIGURES 5 and 6, it will be apparent that there are two such bores 34 and two bushings 36 in each of the projections 23.

A guide rod 37 has the opposite ends thereof engaged in a bushing 36 in each of the valve body halves 14, 15 on each side of the longitudinal center line of the valve body 11, as is best shown in FIGURE 7. Also, a valve stem 38 has its opposite ends engaged in opposite bushings 36 on each side of the longitudinal center line of the valve body 11. At this time, it is pointed out that only the valve stems 38 rotate, the guide rods 37 being stationary. Accordingly, if it is so desired, the bushings 36 may be omitted in the places where the ends of the guide rods 37 are received and the bores made correspondingly smaller. On the other hand, for convenience of interchangeability, it is desirable to have bushings 36 in each bore 34 so that the valve stems and guide rods may be interchangeably positioned within the valve body 11.

A pair of strong backs, each being generally referred to by the numeral 39, is carried by the guide rods 37 and the valve stems 38. Each strong back 39 is of a generally rectangular configuration and is relatively elongated as compared to its width. The general outline of a strong back is shown in FIGURE 7. Each end of each strong back 39 is provided with an internally threaded bore 40 receiving an enlarged threaded portion 41 of an associated one of the valve stems 38. Also, each end of each strong back 39 is provided with a smaller diameter bore 42 which is relatively smooth and which receives an associated one of the guide rods 37. At this time, it is pointed out that each of the valve stems 38 has a pair of spaced externally threaded portions 41 with the two portions 41 being of different hand so that when the valve stems 41 are rotated, the strong backs 39 will be moved in opposite directions.

Each of the strong backs 39 has an offset central portion 43 defining a pocket 44 receiving the mounting block 33 of a respective one of the diaphragms 26. Each mounting block 33 is provided with fasteners 45 for securing the respective diaphragm 26 to a respective one of the strong backs 39 for movement therewith.

In order that the valve stems 41 may be simultaneously rotated, the boss 18 is provided with a bore 46 in which a main valve stem 47 is rotatably journaled. The main valve stem 47 has an intermediate collar 48 which is seated in a recess 49 in the underside of the boss 18 so as to limit upward movement of the main valve stem 47. A control wheel or handle 50 is secured on the upper end of the main valve stem 47, the control wheel 50 having a central hub 51 carrying a transverse pin 52 which extends through the main valve stem 47. The hub 51 engages the upper surface of the boss 18 and prevents downward movement of the main valve stem 47.

A large driving gear 53 is secured on the inner end of the main valve stem 47 and within the general confines of the valve body half 14. This main driving gear 53 is meshed with driven gears 54 of a much smaller size. The driven gears 54 are secured onto the valve stems 38 in any suitable manner, including by means of pins 55. Due to the relative sizes of the gears 53 and 54, it will be seen that a slight rotation of the control wheel 50 will result in a rotation of the valve stems 38 to a much greater degree. Thus, the strong backs 39 are quickly moved in response to rotation of the control wheel 50.

It will be readily apparent that when the strong backs 39 are separated, the diaphragms 26 will be separated and the flow passage 25 opened for the flow of fluid therethrough. On the other hand, when the strong backs 39 are moved together to clamp the diaphragms 26 therebetween, due to the fact that the strong backs 39 extend transversely of the valve body 11 substantially the full internal width thereof, as is clearly shown in FIGURES 5 and 6, the central portions of the diaphragms 26 will be transversely clamped together to completely close the flow passage 25. Further, it will be apparent that the clamping together of the diaphragms 26, as is clearly shown in FIGURE 6, will prevent any flow of fluid through the flow passage 25. In addition, since the diaphragms 26 are peripherally sealed, there is no possibility of escape of fluid into the interior of the valve body 11 outwardly of the split sleeve 24 under any conditions of the flow control valve 10.

It is to be understood that the strong backs 39 may assume intermediate positions between flow passage closing positions and fully open positions so as to restrict the flow of fluid through the flow control valve 10 without stopping the flow of fluid.

The threaded enlarged portions 41 of the valve stems 38 have been illustrated as having like pitch threads but of different hands to effect the opposite movements of the strong backs 39 in response to rotation of the valve stems 38. However, if desired, one of the strong backs 39 may be moved further and more rapidly than the other strong back 39 by varying the pitch of the threads of the two threaded portions 41 of each valve stem 38. Further, if desired, one of the strong backs 39 could be maintained in a stationary position by eliminating the threaded connection thereof with the valve stems 38 and providing suitable means for fixedly positioning the same.

It will be readily apparent that the flow control valve 10 is of a construction wherein leakage is entirely prevented by the specific construction of the split sleeve 24. It will also be apparent that the means for controlling the positions of the diaphragms 26 are of a nature wherein rapid action of the flow control valve 10 may be accomplished. These are highly desirable features in a valve construction.

From the foregoing, it will be apparent that there has been devised a highly desirable flow control valve for the intended purpose. Although only one form of the flow control valve has been illustrated and described, it is to be understood that suitable minor modifications may be made in the flow control valve within the spirit and scope of this invention, as defined in the appended claims.

We claim:

1. A flow control valve comprising a split valve body formed of two halves secured together, said valve body having inlet and outlet openings, a split sleeve extending between said inlet and outlet openings and defining a flow passage therebetween, said split sleeve being formed of opposed diaphragms possessing flexibility and having longitudinal edges clamped between said valve body halves and sealed relative to each other along the edges thereof, means for moving said diaphragms in opposite directions between contacting flow passage closing positions and spaced flow passage open positions, each of said diaphragms being provided with a plurality of nested continuous peripheral grooves and projections extending over the entire area between the central portion of the clamped edges thereof whereby two way stretching of said movable diaphragms by bending the projections thereof may be accomplished, opposed transversely extending strong backs mounted against rotation being connected to central portions of said diaphragms for clamping said diaphragms together to form an effective seal, and said diaphragm moving means being connected to said strong backs, said strong backs having opposed faces conforming to the contours of said diaphragms whereby an effective seal may be obtained.

2. A flow control valve comprising a split valve body formed of two halves secured together, said valve body having inlet and outlet openings, a split sleeve extending between said inlet and outlet openings and defining a flow passage therebetween, said split sleeve being formed of opposed diaphragms possessing flexibility and having longitudinal edges clamped between said valve body halves and sealed relative to each other along the edges thereof, means for moving said diaphragms in opposite directions between contacting flow passage closing positions and spaced flow passage open positions, each of said diaphragms being provided with a plurality of nested continuous peripheral grooves and projections extending over the entire area between the central portion of the clamped edges thereof whereby two way stretching of said movable diaphragms by bending the projections thereof may be accomplished, opposed transversely extending strong backs mounted against rotation being connected to central portions of said diaphragms for clamping said diaphragms together to form an effective seal, and said diaphragm moving means being connected to said strong backs, said diaphragm moving means including stems at opposite ends of said strong backs, each of said stems including a pair of oppositely threaded portions threadedly engaged with said strong backs for simultaneously moving said strong backs in opposite directions, and guide rods for the strong backs carried by said body adjacent said valve stems, said valve stems and said guide rods being disposed in a rectilinear pattern.

3. The flow control valve of claim 2 wherein said valve stems are driven from a single gear mounted within said valve body.

4. The flow control valve of claim 2 wherein said valve stems and said guides are mounted entirely within said valve body and sealed by said diaphragm.

References Cited by the Examiner

UNITED STATES PATENTS

| 2,898,078 | 8/59 | Stephenson | 251—5 |
| 3,011,758 | 12/61 | McFarland | 251—331 |

FOREIGN PATENTS

| 506,237 | 1951 | Belgium. |
| 571,050 | 1924 | France. |
| 1,022,192 | 1953 | France. |
| 1,056,327 | 1954 | France. |
| 504,449 | 1930 | Germany. |
| 643,904 | 1950 | Great Britain. |

ISADOR WEIL, *Primary Examiner.*

M. CARY NELSON, *Examiner.*